P. POLLARD.
HOLDER FOR INSECTIFUGE.
APPLICATION FILED OCT. 9, 1909.
958,678.
Patented May 17, 1910.
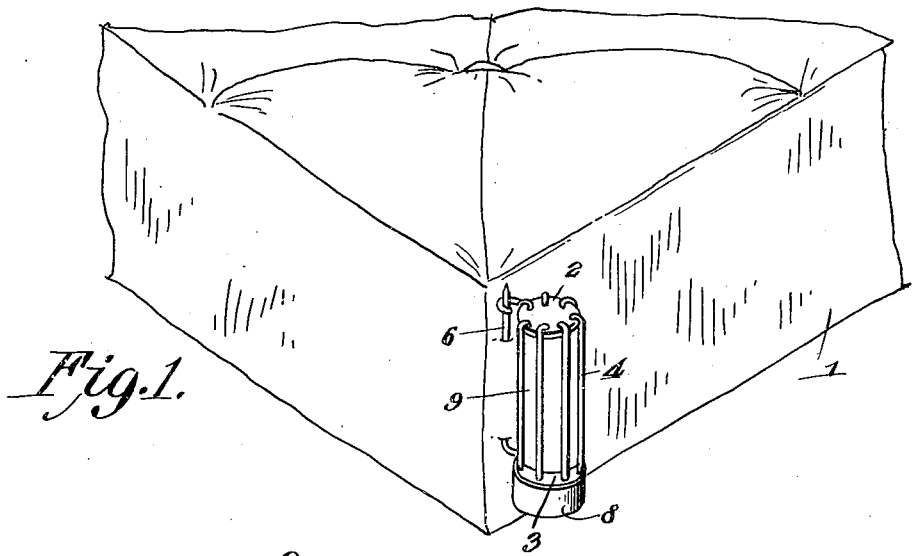
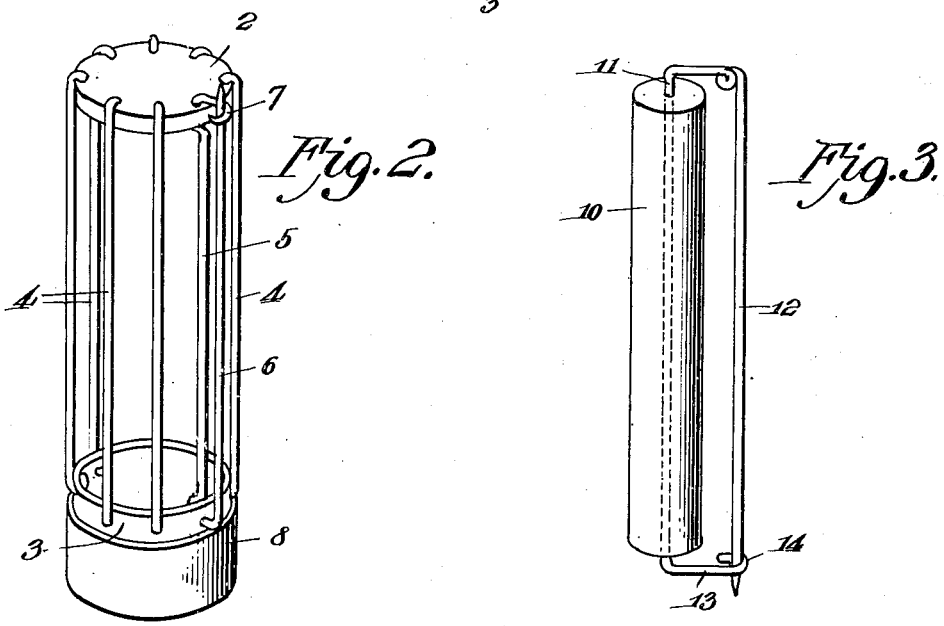
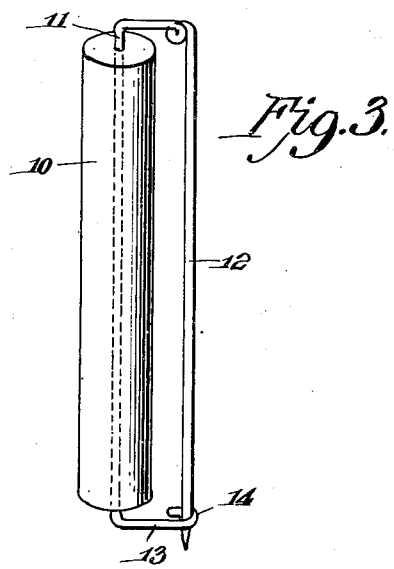
Witnesses
Inventor
Paxton Pollard.
By Victor J. Evans.
Attorney

UNITED STATES PATENT OFFICE.

PAXTON POLLARD, OF NORFOLK, VIRGINIA, ASSIGNOR OF ONE-HALF TO JOHN E. LEDBETTER, OF NORFOLK, VIRGINIA.

HOLDER FOR INSECTIFUGE.

958,678.  Specification of Letters Patent.  Patented May 17, 1910.

Application filed October 9, 1909. Serial No. 521,865.

*To all whom it may concern:*

Be it known that I, PAXTON POLLARD, a citizen of the United States of America, residing at Norfolk, in the county of Norfolk and State of Virginia, have invented new and useful Improvements in Holders for Insectifuge, of which the following is a specification.

This invention relates to insect destroyers for beds, and one of the principal objects of the same is to provide simple means for holding an insect destroying compound or material firmly connected to a mattress or portion of a bed.

Another object of the invention is to provide a holder for a stick of camphor or other bed bug destroyer connected to the mattress, said holder being open to permit the camphor to have free access to the air.

These and other objects may be attained by means of the construction illustrated in the accompanying drawing, in which,—

Figure 1 is a perspective view of one corner of a mattress, showing my invention applied thereto. Fig. 2 is a perspective view of the holder disconnected from the mattress. Fig. 3 is a similar view of a modified form of my invention.

Referring to the drawing, the numeral 1 designates a mattress or bed spring of any suitable construction having attached to one corner thereof an insect destroyer holder made in accordance with my invention, said holder comprising an upper disk 2 and a lower ring 3 connected by a spaced wire cage comprising bars or strands 4 attached at their ends to said disk and ring in any suitable manner. One of the wire bars or strands 5 is extended to form an attaching pin 6 and a keeper or guard 7 at one end thereof. A suitable cap or cover 8 is frictionally secured at one end of the holder. A stick of camphor 9 or other suitable bug-destroying material or compound is disposed within the holder, as shown in Fig. 1.

Referring to Fig. 3, the stick 10 of insect destroying material or compound is connected to a wire shank 11, the latter extending through the stick 10 and provided with a pin 12 disposed in a plane parallel to the stick for attachment to a mattress. The wire shank 11 is bent at one end, as at 13, and the terminal is formed into a guard 14 for the pin 12.

From the foregoing it will be obvious that a holder made in accordance with my invention can be quickly attached to or detached from the mattress, that any suitable destroying compound or material may be readily placed within the casing and quickly renewed whenever required, and can be manufactured at very slight cost. It is a well known fact that bed bugs and other insects will not infest a bed where the fumes of camphor are present. Other materials of this character may be used in the holder.

I claim:—

A holder for insectifuge comprising a cage including a disk and a ring, a plurality of wire strands having their opposite ends connected to said disk and ring, one of said strands being extended to form a safety pin for connecting the holder to a mattress, and a cap frictionally secured to the ring and serving to seal one end of the holder.

In testimony whereof I affix my signature in presence of two witnesses.

PAXTON POLLARD.

Witnesses:
JOHN L. RANDOLPH,
WM. L. STALLINGS.